F. I. & B. P. REMY & A. BERGER.
TRACTION WHEEL CLEAT.
APPLICATION FILED DEC. 13, 1912.

1,090,410.

Patented Mar. 17, 1914.

WITNESSES:
A. H. Edgerton
Orpha M. McLaughlin

INVENTORS
BENJAMIN P. REMY,
FRANK I. REMY AND
ARTHUR BERGER
BY W. H. Lockwood
ATTORNEY.

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

TRACTION-WHEEL CLEAT.

1,090,410.  Specification of Letters Patent.  Patented Mar. 17, 1914.

Application filed December 13, 1912. Serial No. 736,525.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Traction-Wheel Cleat; and we do hereby declare that the following is a full, clear, and exact description thereof, reference being had to the accompanying drawings, in which like letters refer to like parts.

The object of this invention is to improve the construction of cleats in connection with tractor wheels, whereby when the cleats are not needed they will not project beyond the periphery of the wheel rims, or, when needed, may be adjusted so as to project beyond the periphery of the wheel.

The chief feature of the invention consists in providing openings in the wheel rim in which the cleat may lie when not in use and flush with the surface of wheel, but which may be pivoted and turned so as to project outward beyond the rim of the wheel. A removable pin or other means is provided for holding the cleat in each of its positions.

The nature of the invention will be understood from the accompanying drawings and the following description and claims.

Figures 1, 2, 3:
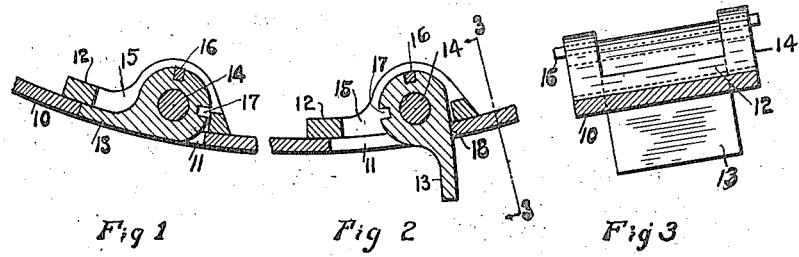
Figures 4, 5, 6:
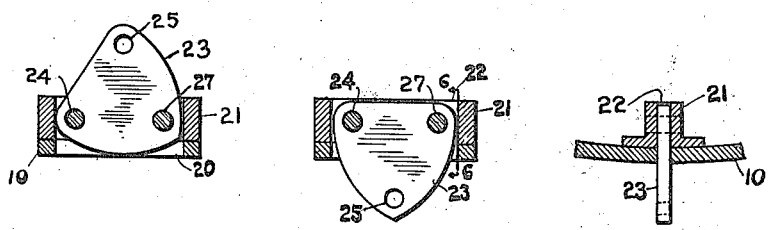

In the drawings, Figure 1 is a longitudinal section through a portion of the wheel rim showing a cleat in an inoperative position. Fig. 2 is the same showing the cleat in an operative position. Fig. 3 is a transverse section on the line 3—3 of Fig. 2. Fig. 4 is a section through the wheel rim showing a modified form of cleat in inoperative position. Fig. 5 shows the same, but with the cleat extending outward in operative position. Fig. 6 is a longitudinal section through a portion of the wheel rim on the line 6—6 of Fig. 5.

As herein shown there is a fragmentary portion of the rim 10 of a tractor wheel. In the first three figures said rim has an opening 11 extending through it and on the inner surface of said rim and registering with said slot 11 there is a bearing bracket 12 having two upwardly extending ears at the sides between which the cleat 13 is mounted on a pin 14 which extends through said ears. The cleat consists of a plate of substantially the same width as the opening 11 and with a head or rounded portion surrounding said pin 14, the parts being of such dimensions that in one position, say Fig. 1, the cleat will lie in the opening 11 and be flush with the external surface of the rim, while in the position shown in Fig. 2, the plate part of the cleat will project radially outward beyond the periphery of the wheel. When the cleat is in its inner position, as in Fig. 1, the front end thereof bears against the underside of the bearing bracket so that the cleat can resist the pressure or strain without being forced inward. The bearing bracket has an opening 15 in it registering with a portion of the opening 11 so that when the cleat is opened outward, as shown in Fig. 2, mud can pass through the rim and bearing bracket and not interfere with the operation of the device. The cleat is locked in its inner and outer positions by means of a bar 16 which extends transversely of the wheel rim through openings in the ears of the bearing bracket loose enough so that said bar can be removed. The cleat has in the periphery of the inner portion thereof a pair of slots 17 about 90° apart so that when the cleat is in its inner position, the bars 16 will extend through one of said slots and lock the cleat in such position and when the cleat is turned outward the bar is inserted through the other one of said slots and will lock the cleat in that position. In this latter position also the cleat bears against the wheel rim at one end of the opening 11 at 18 which serves as an abutment to strengthen the position of the cleat and enable it to resist strain as the wheel travels. This latter is a very important feature as it coöperates with the pin 14 and locking bar 16 in holding the cleat in place against stress.

In the modified form shown in Figs. 4, 5 and 6, instead of the opening 11 there is a transverse slot 20 in the wheel rim and a bearing bracket 21 is shaped differently from the other bearing bracket so that it has otherwise a transverse slot 22 in the bearing bracket which registers with the slot 20. Therefore, the slots 20 and 22 register with each other and in them there is a cleat 23 having substantially the shape of a shield which is pivoted on a fixed pin 24 in the bearing bracket, said pin extending loosely through a hole 25 in one corner of the cleat. There is a hole 25 in each of the three corners of the shield and the two curved surfaces of the shield are concentric with the opposite hole 25. Therefore, the cleat can be turned from the position shown in Fig. 4 to that shown in Fig. 5. When in the position shown in Fig. 4, a locking pin 27 is inserted for holding it in that position and then the cleat does not extend beyond the periphery of the wheel and close the opening or slot therethrough. When it is desired to use the cleat, the pin 27 is removed and the cleat turned outward to the position shown in Fig. 5, and the pin inserted through another hole in the cleat, but in the same holes in the bearing bracket 21. In its outer position, it resists strain because it bears against the wheel rim along one side of the slot 20 and also the bearing bracket holds the upper end in place.

We claim as our invention:

1. A tractor wheel rim having an opening therein, a bearing bracket on the inner surface thereof at said opening, a cleat pivoted in said bearing bracket and adapted to be turned inward and lie in said opening and not extend beyond the outer surface of the wheel rim and to be turned outward, and removable locking means in said bearing bracket for locking the cleat to said bracket when in its different positions.

2. A tractor wheel rim having an opening therein, a bearing bracket on the inner surface thereof at said opening, a cleat pivoted in said bearing bracket and adapted to be turned inward and lie in said opening and not extend beyond the outer surface of the wheel rim and to be turned outward, and a removable bar in said bearing bracket, said cleat having openings through it away from its pivotal center through which said locking bar is adapted to project for locking the cleat in its different positions.

3. A tractor wheel rim having an opening therein, a bearing bracket on the inner surface thereof at said opening, a cleat pivoted in said bearing bracket and adapted to be turned inward and lie in said opening and not extend beyond the outer surface of the wheel rim and to be turned outward, and removable locking means in said bearing bracket for holding the cleat in its different positions, said parts being arranged so that when the cleat is in its outer position it will bear against the wheel rim along one portion of said opening in the wheel rim.

4. A tractor wheel rim having an opening therein, a bearing bracket on the inner surface thereof at said opening, a cleat pivoted in said bearing bracket and adapted to be turned inward and lie in said opening and not extend beyond the outer surface of the wheel rim and to be turned outward, and removable locking means in said bearing bracket for holding the cleat in its different positions, said parts being arranged so that when the cleat is in its outer position it will bear against the wheel rim along one portion of said opening in the wheel rim and the bearing bracket arranged so as to engage the free end of the cleat and limit the inward movement thereof.

In witness whereof, we have hereunto affixed our signatures in the presence of the witnesses herein named.

FRANK I. REMY.
BENJAMIN P. REMY.
ARTHUR BERGER.

Witnesses:
H. B. POLAND,
RUTH I. MILLER.